Figure 1:
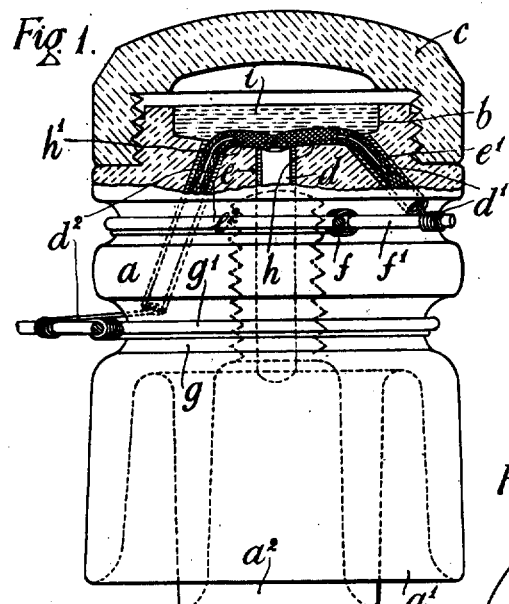

T. F. PURVES & J. SINNOTT.
INSULATOR.
APPLICATION FILED FEB. 3, 1908.

898,921.

Patented Sept. 15, 1908.
2 SHEETS—SHEET 1.

WITNESSES

INVENTOR Thomas F. Purves
John Sinnott
James L. Norris
atty

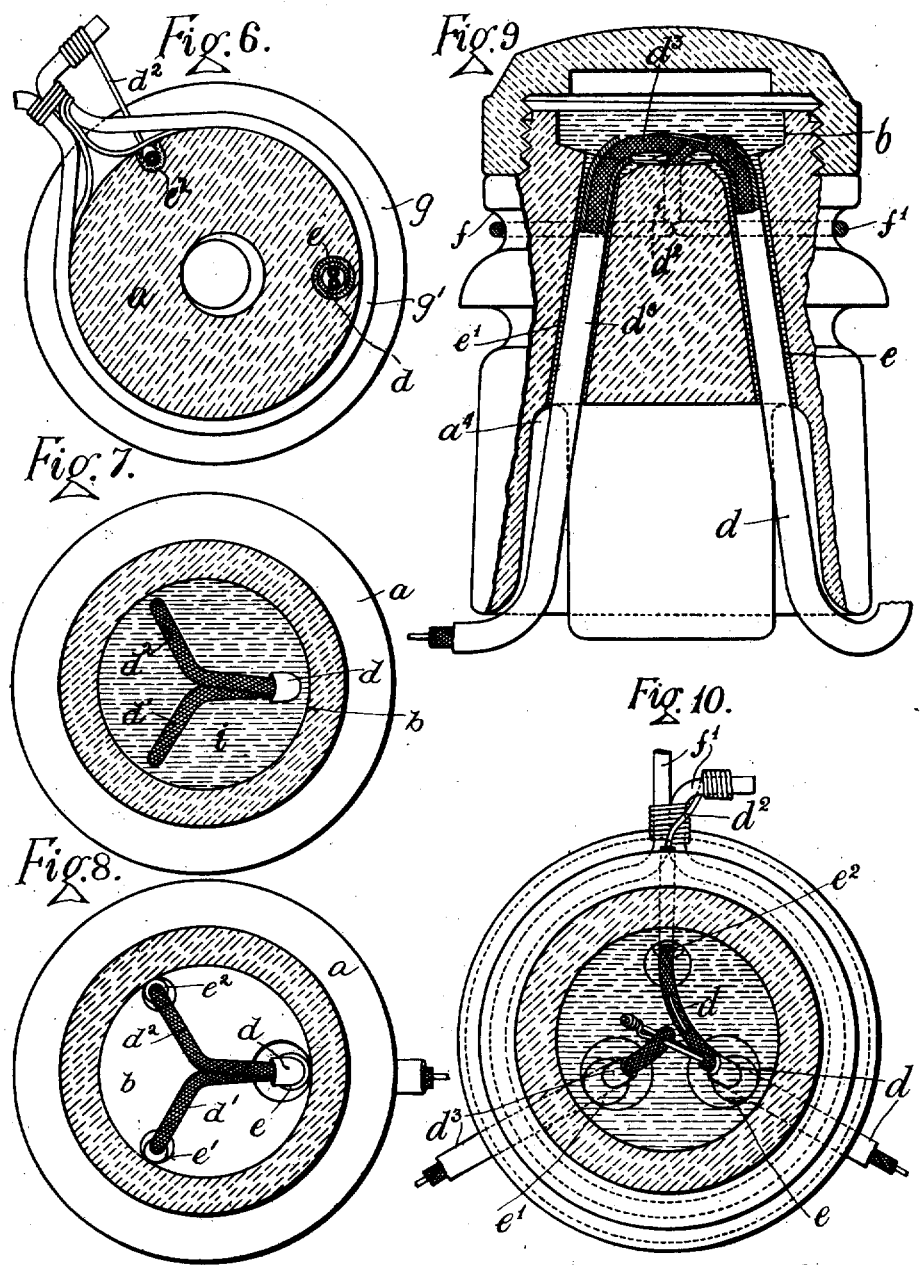

UNITED STATES PATENT OFFICE.

THOMAS FORTUNE PURVES, OF WANDSWORTH, LONDON, AND JOHN SINNOTT, OF EAST FINCHLEY, LONDON, ENGLAND.

INSULATOR.

No. 898,921.　　　Specification of Letters Patent.　　　Patented Sept. 15, 1908.

Application filed February 3, 1908. Serial No. 414,114.

*To all whom it may concern:*

Be it known that we, THOMAS FORTUNE PURVES and JOHN SINNOTT, subjects of the King of Great Britain, residing at 21 Windmill road, Wandsworth, London, S. W., England, and 74 Lincoln road, East Finchley, London, N., England, respectively, have invented certain new and useful Improvements in Electrical Insulators for Telephone or Telegraph Wires and the Like, of which the following is a specification.

This invention has reference to what are commonly known as leading-in or distributing insulators to which the ends of open or bare line or circuit wires are attached, and from which the covered or insulated leading-in wires or cables proceed into a building or the like for the purpose of connecting up a telephone, telegraph or other instrument to the said line or circuit wires.

The leading-in cables employed in the usual metallic circuits of telephone and like systems are generally of the fibrous-core type in which two (or more) conductors are insulated with cotton, paper or other moisture-resisting material and are collectively sheathed in a lead or other metallic covering, and in connecting the ends of such cables with the line-wires it is essential to make some provision for sealing the cable so as to prevent the access of moisture to the conductors.

The course usually adopted is to terminate the leading-in cable in an air-tight connection box or fitting which is separate or distinct from the line-wire insulators and is filled with some insulating compound and to make the connection, within the said box, between the separated individual conductors of the leading-in cable and certain wires which proceed from the box to the open-wire insulators and are covered with gutta-percha, india-rubber or other anhydrous insulating material. The use of such separate insulating boxes or the like necessarily involves considerable expense in their installation and maintenance, and further, the employment of rubber-sheathed conductors between the boxes and the line-wire insulators is a disadvantage, both in respect of their cost and of the tendency of the insulating coverings to perish or deteriorate under atmospheric influence.

The object of the present invention is to obviate these disadvantages by dispensing entirely with the use of separate connection or junction boxes or the like and their rubber-covered external conductors, and by making provision for the insulation and sealing of the individual and separated conductors of a duplex or multiple lead-sheathed cable actually within the leading-in insulator itself, and in such a simple but effective manner that the access of moisture to the said cable is entirely prevented and all risk of electrical leakage between the separate conductors of the cable, or between the external wires and the covering or sheath of the cable, is obviated, in addition to which, the separated and insulated conductors of the cable can be directly connected to the bare line-wires which are carried from the said insulators. Thus, we propose to form or provide within the top of a leading-in insulator, a cable-sealing or insulation chamber or cavity into which the lead-sheathed cable is introduced through a suitable passage, and wherein the inner ends of the individual conductors contained in said cable are separated from one another after being stripped from the sheathing and then passed respectively through suitable holes or openings running from the sealing cavity or chamber to the exterior of the insulator, where the said conductors are connected with the naked line-wires.

The sealing and insulation of the end of the sheathed cable and the complete isolation of the stripped and separated conductors from one another and also from the metallic sheathing is effected by filling the chamber or cavity with wax or other non-conducting material or composition which not only seals up, the end of the sheathing and runs between the parts of the separated conductors that lie in the said chamber, but also fills up the holes or passages leading from the chamber to the exterior of the insulator and thus effectually excludes the wet and prevents moisture from creeping from the outside of the said insulator to any part of the cable or conductors that are located within it.

In Figures 1 to 8 of the accompanying drawings, we represent one form of our improved leading-in insulator which is adapted to carry both the bare line-wires of an ordinary metallic telephone circuit, while Figs. 9 and 10 represent a modified form of insulator which is designed to carry only one of the said line wires but provides for the connection of one of the conductors of the cable to the second line wire which is carried from an independent insulator so as to provide for high insulation between the said conductors.

Figure 3:
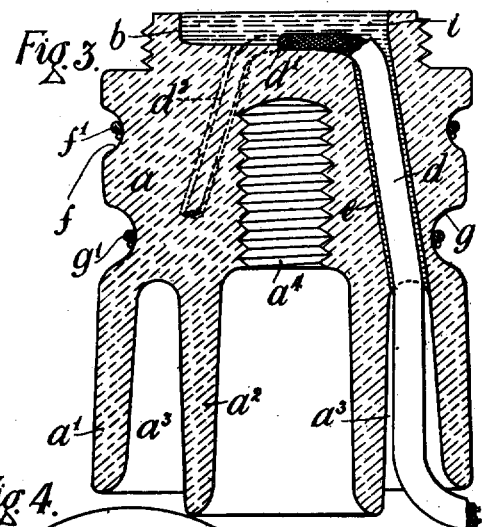
Figure 4:
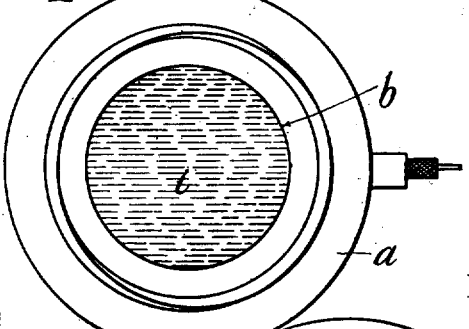
Figure 2:
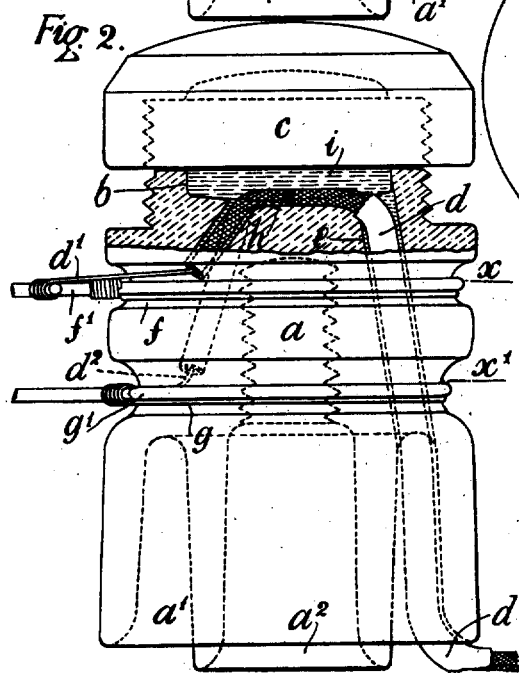
Figure 5:
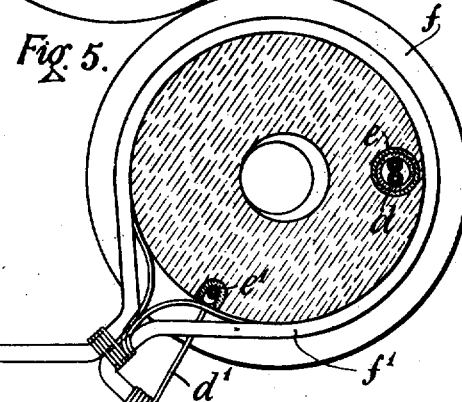

Referring to the arrangement shown in Figs. 1 to 8; Fig. 1 represents an elevation of the improved insulator but the upper part is drawn in section so as to show more clearly the arrangement of the sealing chamber or cavity and of the passages that are provided for the reception of the lead-sheathed leading-in cable and of the separated conductors which are connected respectively to the two bare line-wires that are attached to the said insulator. Fig. 2 is another sectional elevation showing the insulator rotated through an angle of 90 degrees from the position shown in Fig. 1. Fig. 3 is a complete vertical section of the insulator body, without the cap, the section being taken through the passage which is provided for the running of the lead-sheathed part of the cable from the sealing chamber. Fig. 4 is a plan of Fig. 3. Figs. 5, 6, and 7 show three different horizontal sections of the insulator, taken respectively upon the dotted lines $x^1$ $x^2$ and $x^3$, Fig. 1. Fig. 8 shows one horizontal section of the sealing box without its filling of insulating material.

The same letters of reference indicate corresponding parts in Figs. 1 to 8.

The body $a$ of the insulator is of substantially the ordinary form and has two petticoats $a^1$, $a^2$, with an intermediate shed $a^3$; also a screwed axial socket at $a^4$ to provide for its attachment to an insulator bolt or spindle. In the top of this body part there is sunken, a circular cavity or chamber $b$ of suitable dimensions, over which a cap or cover $c$ is screwed to complete the said cavity, into which the lead-sheathed cable $d$ is introduced by way of a hole or passage $e$ formed through the body of the insulator and leading from the top of the shed $a^3$ into the bottom of the said cavity, while to provide for the conveyance of the stripped and separated conductors $d^1$, $d^2$, of the said cable respectively to the two bare line-wires $f^1$, $g^1$, which are run round and secured within grooves $f$, $g$, on the outside of the insulator, two other holes or passages $e^1$, $e^2$ are directed obliquely from the cavity and terminate respectively in the said grooves $f$, $g$.

As will be seen from the drawings, the sheathed part of the cable terminates in the cavity $b$ and the conductors $d^1$, $d^2$ are separated and passed respectively through the passages $e^1$, $e^2$, so that the stripped or bared extremities of the wires extend through the outer ends of the said passages and are connected to the line wires that lie within the grooves $f$, $g$.

To seal the end of the cable and insulate the separated conductors from one another, as well as to exclude moisture, the cavity is completely filled with wax or other non-conducting material, which is preferably run-in in a molten condition so that it will flow into the passages $e^1$ $e^2$ and completely fill up any spaces that might otherwise be left between the wires and the inside of said passage so that it is impossible for any moisture to creep up the passages into the cavity and obtain access to the sealed parts of the cable and conductors. After the filling of the cavity, the cap or cover is screwed on as shown in Fig. 1.

The improved insulator may be adapted for carrying any number of wires and connecting same with the separated conductors of a cable by forming a suitable number of grooves around the exterior of the insulator and providing conductor passages or holes from each of the said grooves into the sealing cavity or chamber.

In the modified form of sealing insulator shown in Figs. 9 and 10 two cable passages, $e$, $e^1$, are formed between the shed $a^4$ and the sealing cavity $b$ and only one of the external grooves is connected with the said cavity by the passage $e^2$. The sheathed duplex or multiple-conductor cable $d$ is passed through the shed $a^4$ and up the passage $e$ into the cavity $b$ where its conductors are separated, sealed and insulated by the filling of wax as in the previously described arrangement. One of these conductors $d^2$ is passed out through the passage $e^2$ and connected to the line-wire $f^1$ in the groove $f$, whereas the other conductor is connected to a sheathed or insulated single conductor $d^3$ which is directed from the sealing-chamber down the passage $e^1$ into the shed and may be taken on to a second insulator or otherwise. In this modification the wax filling in the sealing chamber serves to seal and insulate the connection between the one conductor of the cable $d$ and the single sheathed conductor $d^3$, as well as to seal and insulate that conductor $(d^2)$ which is run through the passage $e^2$ to the outside line wire. Any number of holes or passages may be formed between the shed and the sealing chamber or cavity, according to the number of single sheathed conductors which are required to be connected up with the separated conductors of the multiple cable, but in every case the whole of the connections are sealed and insulated when the said chamber or cavity is filled with the non-conducting material. If necessary, the bottom of the sealing cavity of the insulator shown in Figs. 1 to 8, may be provided with grooves $h$, $h^1$, in which the separated conductors are laid to keep them well apart.

It is admittedly not new to provide an electric insulator of the double bell type with two perforations running from the shed to the top of the insulator to enable a single connecting wire, covered with anhydrous material, to be passed up the one perforation, over the said insulator top, and down the other perforation; also to admit of a portion of the said insulator being protected from exposure to weather and consequent surface leakage by means of a cap which is screwed onto the said top, but such insulators are not adapted for making and sealing and insulating junctions between the separated conductors of a sheathed duplex or multiple cable, neither do they provide for dealing with more than one wire running in and out.

Having fully described our invention, what we desire to claim and secure by Letters Patent is:—

1. A leading-in insulator for telephone and other electrical wiring systems, provided with a sealing chamber or cavity adapted to be filled with insulating material, and a series of holes or passages directed into said chamber from the outside of the insulator, one of the said holes providing for the introduction of a sheathed duplex or multiple-conductor cable into the sealing-chamber, while the other holes provide for the connection of the said cable, by the separated individual conductors of the cable, to two or more line-wires which are attached to the exterior of the said insulator, substantially as herein described.

2. An insulator of the type set forth comprising a body portion formed with a chamber and with a cable passage extending into said chamber from the exterior of said insulator, said chamber being for the reception of an insulating agent, said body portion having wire passages extending from said chamber to the outer face of said body portion, and a closure for said chamber.

3. An insulator of the type set forth comprising a body having a chamber to contain insulating material, said body having a cable passage extending from the exterior to said chamber and having a wire passage extending from said chamber to its exterior face, and a closure for said chamber.

4. An insulator of the type set forth comprising a body portion constructed with an interior chamber to receive an insulating agent and with passages extending to and communicating with said chamber from the outer face of said body portion, as and for the purpose set forth.

5. An insulator of the type set forth comprising a body portion constructed with a chamber to contain an insulating agent, said body portion being formed with spaced petticoats and with an annular groove in its outer face, said body portion having a cable passage extending from a point between said petticoats to and in communication with said chamber and having a wire passage extending from said chamber to and in communication with said groove, as and for the purpose set forth.

In testimony whereof we have hereunto set our hands in presence of two subscribing witnesses.

THOMAS FORTUNE PURVES.
JOHN SINNOTT.

Witnesses:
T. L. RAND,
H. D. JAMESON.